United States Patent
Zhuang et al.

(10) Patent No.: US 12,284,698 B2
(45) Date of Patent: Apr. 22, 2025

(54) SECURE PEER-TO-PEER CONNECTIONS BETWEEN MOBILE DEVICES

(71) Applicant: Snap Inc., Santa Monica, CA (US)

(72) Inventors: Richard Zhuang, San Diego, CA (US); Matthew Hallberg, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 259 days.

(21) Appl. No.: 17/813,901

(22) Filed: Jul. 20, 2022

(65) Prior Publication Data

US 2024/0032121 A1    Jan. 25, 2024

(51) Int. Cl.
| | |
|---|---|
| *H04W 76/14* | (2018.01) |
| *H04W 4/021* | (2018.01) |
| *H04W 4/80* | (2018.01) |
| *H04W 48/16* | (2009.01) |

(52) U.S. Cl.
CPC .......... *H04W 76/14* (2018.02); *H04W 4/021* (2013.01); *H04W 4/80* (2018.02); *H04W 48/16* (2013.01)

(58) Field of Classification Search
CPC ....... H04W 4/021; H04W 4/80; H04W 48/16; H04W 76/14
USPC ......................................................... 455/41.2
See application file for complete search history.

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

Pierdicca et al., "The use of Augmented Reality glasses for the application in Industry 4.0", Unisersita Politecnica delle Marche, Italy, 13 pages. (Year: 2017).*

(Continued)

*Primary Examiner* — Mong-Thuy T Tran
(74) *Attorney, Agent, or Firm* — Schwegman Lundberg & Woessner, P.A.

(57) ABSTRACT

A communication link is established between a first mobile device and a second mobile device using communication setup information in a machine-readable code that is displayed on a display of the second mobile device. The first mobile device captures and decodes an image of the machine-readable code to extract dynamically-generated communication setup information. A communication link is then established between the two devices using the communication setup information. The machine readable code may also be used as a fiducial marker to establish an initial relative pose between the two devices. Pose updates received from the second mobile device can then be used as user-interface inputs to the first mobile device.

20 Claims, 12 Drawing Sheets

(56) References Cited

U.S. PATENT DOCUMENTS

| | | |
|---|---|---|
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,430,310 B1 * | 4/2013 | Ho ........................ G06F 21/35 235/382 |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,191,620 B1 | 11/2015 | Katzer et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,180 B2 | 4/2019 | Yamamoto et al. |
| 10,348,662 B2 | 7/2019 | Baldwin et al. |
| 10,362,219 B2 | 7/2019 | Wilson et al. |
| 10,387,484 B2 | 8/2019 | Kennedy et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,572,005 B2 * | 2/2020 | Zahn .................... G06F 1/1698 |
| 10,573,048 B2 | 2/2020 | Ni et al. |
| 10,645,092 B1 | 5/2020 | Bonar et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,764,053 B2 | 9/2020 | Brook et al. |
| 10,805,248 B2 | 10/2020 | Luo et al. |
| 10,857,450 B1 | 12/2020 | Aman et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,055,891 B1 | 7/2021 | Ofek et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,233,799 B1 | 1/2022 | Whyte et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-HernÁNdez et al. |
| 11,284,144 B2 | 3/2022 | Kotsopoulos et al. |
| 11,360,733 B2 | 6/2022 | Cardenas Gasca et al. |
| 11,452,939 B2 | 9/2022 | Tham et al. |
| 11,553,049 B2 * | 1/2023 | Tsuji .................... H04L 51/224 |
| 11,812,194 B1 * | 11/2023 | Vandyke ................ G06F 3/167 |
| 11,893,301 B2 | 2/2024 | Cardenas Gasca et al. |
| 12,051,163 B2 | 7/2024 | Canberk et al. |

(56) References Cited

U.S. PATENT DOCUMENTS

| | | |
|---|---|---|
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0094417 A1 | 4/2008 | Cohen |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0214585 A1 | 8/2012 | Paquet |
| 2013/0044129 A1 | 2/2013 | Latta et al. |
| 2013/0103760 A1 | 4/2013 | Golding et al. |
| 2013/0134212 A1 | 5/2013 | Chang |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0281522 A1* | 9/2014 | Bortnem ............... H04W 12/06 713/168 |
| 2015/0062162 A1 | 3/2015 | Kim et al. |
| 2015/0126281 A1 | 5/2015 | Lewis |
| 2015/0206349 A1 | 7/2015 | Rosenthal et al. |
| 2015/0306496 A1 | 10/2015 | Haseltine |
| 2016/0021148 A1 | 1/2016 | Ijaz |
| 2016/0134840 A1 | 5/2016 | Mcculloch |
| 2016/0232715 A1 | 8/2016 | Lee |
| 2016/0234149 A1 | 8/2016 | Tsuda et al. |
| 2016/0346612 A1 | 12/2016 | Rowley |
| 2017/0038829 A1 | 2/2017 | Lanier et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0192495 A1 | 7/2017 | Drinkwater et al. |
| 2017/0199855 A1 | 7/2017 | Fishbeck |
| 2017/0235848 A1 | 8/2017 | Van Dusen et al. |
| 2017/0307889 A1 | 10/2017 | Newman |
| 2017/0310934 A1 | 10/2017 | Du et al. |
| 2017/0312634 A1 | 11/2017 | Ledoux et al. |
| 2017/0322655 A1 | 11/2017 | Stafford |
| 2017/0354875 A1 | 12/2017 | Marks et al. |
| 2018/0033204 A1 | 2/2018 | Dimitrov et al. |
| 2018/0034867 A1 | 2/2018 | Zahn et al. |
| 2018/0047200 A1 | 2/2018 | O'hara et al. |
| 2018/0088663 A1 | 3/2018 | Zhang et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0239144 A1 | 8/2018 | Woods et al. |
| 2018/0268589 A1 | 9/2018 | Grant |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315247 A1 | 11/2018 | Van |
| 2018/0350144 A1 | 12/2018 | Rathod |
| 2018/0350150 A1 | 12/2018 | Powderly et al. |
| 2019/0001223 A1 | 1/2019 | Blackstock et al. |
| 2019/0054379 A1 | 2/2019 | Ackley et al. |
| 2019/0057616 A1 | 2/2019 | Cohen et al. |
| 2019/0066387 A1 | 2/2019 | Grossmann et al. |
| 2019/0087801 A1* | 3/2019 | Govindarajan .... G06Q 20/3274 |
| 2019/0097958 A1 | 3/2019 | Collet et al. |
| 2019/0151757 A1 | 5/2019 | Kozloski et al. |
| 2019/0188920 A1 | 6/2019 | Mcphee et al. |
| 2019/0222654 A1* | 7/2019 | Singhal ................. H04W 4/029 |
| 2019/0272674 A1 | 9/2019 | Comer et al. |
| 2019/0280997 A1 | 9/2019 | Baldwin et al. |
| 2019/0295320 A1 | 9/2019 | Ghatak et al. |
| 2019/0310757 A1 | 10/2019 | Lee et al. |
| 2019/0311513 A1 | 10/2019 | Han et al. |
| 2019/0318540 A1 | 10/2019 | Piemonte et al. |
| 2019/0356705 A1 | 11/2019 | Escudero et al. |
| 2020/0005026 A1 | 1/2020 | Andersen et al. |
| 2020/0059502 A1 | 2/2020 | Iyer et al. |
| 2020/0066049 A1 | 2/2020 | Sun et al. |
| 2020/0073483 A1 | 3/2020 | Berenzweig et al. |
| 2020/0089313 A1 | 3/2020 | Himane |
| 2020/0098187 A1 | 3/2020 | Herscher et al. |
| 2020/0162851 A1 | 5/2020 | Wilde |
| 2020/0167120 A1 | 5/2020 | Rakshit et al. |
| 2020/0306637 A1 | 10/2020 | Baldwin et al. |
| 2020/0360823 A1 | 11/2020 | Cahill et al. |
| 2020/0372127 A1 | 11/2020 | Denton et al. |
| 2020/0410575 A1 | 12/2020 | Grantham et al. |
| 2021/0019739 A1 | 1/2021 | Almonte et al. |
| 2021/0042724 A1 | 2/2021 | Rathod |
| 2021/0043005 A1* | 2/2021 | Arora ..................... G06F 40/166 |
| 2021/0051147 A1 | 2/2021 | Hardy et al. |
| 2021/0074047 A1 | 3/2021 | Sheth et al. |
| 2021/0089179 A1 | 3/2021 | Grantham et al. |
| 2021/0097286 A1 | 4/2021 | Lehrich et al. |
| 2021/0104087 A1 | 4/2021 | Smith et al. |
| 2021/0118231 A1 | 4/2021 | Hutten et al. |
| 2021/0119884 A1 | 4/2021 | Kim et al. |
| 2021/0124180 A1* | 4/2021 | Amadio ............ G06K 7/10881 |
| 2021/0150295 A1 | 5/2021 | Rangaprasad et al. |
| 2021/0168108 A1 | 6/2021 | Antmen et al. |
| 2021/0170270 A1 | 6/2021 | Brody et al. |
| 2021/0185471 A1 | 6/2021 | Jot et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0248827 A1 | 8/2021 | Baier et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0362029 A1 | 11/2021 | Koblin et al. |
| 2021/0364811 A1* | 11/2021 | Amadio ................. G02B 27/32 |
| 2021/0385180 A1 | 12/2021 | Al Majid et al. |
| 2021/0398314 A1 | 12/2021 | Sivalingam et al. |
| 2021/0405831 A1 | 12/2021 | Mourkogiannis et al. |
| 2021/0409535 A1 | 12/2021 | Mourkogiannis et al. |
| 2021/0409954 A1 | 12/2021 | Frisk et al. |
| 2022/0012929 A1 | 1/2022 | Blackstock et al. |
| 2022/0030197 A1 | 1/2022 | Ishimoto |
| 2022/0075591 A1 | 3/2022 | Cardenas Gasca et al. |
| 2022/0092857 A1 | 3/2022 | Haapoja et al. |
| 2022/0101000 A1 | 3/2022 | Tham et al. |
| 2022/0157002 A1 | 5/2022 | Gelencser |
| 2022/0179665 A1 | 6/2022 | Rathod |

(56) References Cited

U.S. PATENT DOCUMENTS

| | | | |
|---|---|---|---|
| 2022/0222881 | A1 | 7/2022 | Nakade et al. |
| 2022/0276823 | A1 | 9/2022 | Cardenas Gasca et al. |
| 2023/0095621 | A1 | 3/2023 | Gorur et al. |
| 2023/0418542 | A1 | 12/2023 | Cardenas Gasca |
| 2024/0050856 | A1 | 2/2024 | Canberk et al. |
| 2024/0070950 | A1 | 2/2024 | Tran et al. |
| 2024/0071000 | A1 | 2/2024 | Canberk et al. |
| 2024/0119679 | A1 | 4/2024 | Canberk et al. |
| 2024/0221212 | A1 | 7/2024 | Evangelidis |

FOREIGN PATENT DOCUMENTS

| | | | |
|---|---|---|---|
| CN | 116113478 | 5/2023 | |
| EP | 2184092 | 5/2010 | |
| JP | 2001230801 | 8/2001 | |
| JP | 5497931 | 3/2014 | |
| KR | 20120040000 | 4/2012 | |
| KR | 101445263 | 9/2014 | |
| KR | 20210121616 | 10/2021 | |
| WO | 2003094072 | 11/2003 | |
| WO | 2004095308 | 11/2004 | |
| WO | 2006107182 | 10/2006 | |
| WO | 2007134402 | 11/2007 | |
| WO | 2012139276 | 10/2012 | |
| WO | 2013027893 | 2/2013 | |
| WO | 2013064854 | 5/2013 | |
| WO | 2013152454 | 10/2013 | |
| WO | 2013166588 | 11/2013 | |
| WO | 2014031899 | 2/2014 | |
| WO | WO-2014182638 A2 * | 11/2014 | ........... G06Q 50/265 |
| WO | 2014194439 | 12/2014 | |
| WO | WO-2015094220 A1 * | 6/2015 | ............. G06F 1/163 |
| WO | 2016090605 | 6/2016 | |
| WO | 2018081013 | 5/2018 | |
| WO | 2018102562 | 6/2018 | |
| WO | 2018129531 | 7/2018 | |
| WO | 2019089613 | 5/2019 | |
| WO | 2020017682 | 1/2020 | |
| WO | 2022056132 | 3/2022 | |
| WO | 2022170222 | 8/2022 | |
| WO | 2024020389 | 1/2024 | |
| WO | 2024035763 | 2/2024 | |
| WO | 2024044138 | 2/2024 | |
| WO | 2024044184 | 2/2024 | |
| WO | 2024076613 | 4/2024 | |
| WO | 2024145124 | 7/2024 | |

OTHER PUBLICATIONS

"International Application Serial No. PCT US2023 070415, International Search Report mailed Nov. 3, 2023", 5 pgs.
"International Application Serial No. PCT US2023 070415, Written Opinion mailed Nov. 3, 2023", 4 pgs.
"International Application Serial No. PCT US2023 030818, International Search Report mailed Nov. 28, 2023", 3 pgs.
"International Application Serial No. PCT US2023 030818, Written Opinion mailed Nov. 28, 2023", 5 pgs.
"International Application Serial No. PCT US2023 034437, International Search Report mailed Dec. 13, 2023", 4 pgs.
"International Application Serial No. PCT US2023 034437, Written Opinion mailed Dec. 13, 2023", 6 pgs.
"International Application Serial No. PCT US2023 030711, International Search Report mailed Dec. 12, 2023", 3 pgs.
"International Application Serial No. PCT US2023 030711, Written Opinion mailed Dec. 12, 2023", 4 pgs.
"International Application Serial No. PCT US2023 029814, International Search Report mailed Jan. 9, 2024", 6 pgs.
"International Application Serial No. PCT US2023 029814, Written Opinion mailed Jan. 9, 2024", 8 pgs.
"International Application Serial No. PCT US2023 085194, International Search Report mailed May 28, 2024", 5 pgs.

"International Application Serial No. PCT US2023 085194, Written Opinion mailed May 28, 2024", 7 pgs.
"U.S. Appl. No. 17/960,627, Non Final Office Action mailed Jun. 21, 2024", 11 pgs.
"U.S. Appl. No. 17/893,696, Examiner Interview Summary mailed Jul. 1, 2024", 2 pgs.
Kam, Jae Won, "Robust and Fast Collaborative Augmented Reality Framework Based on Monocular SLAM", IEIE Transactions On Smart Processing andComputing, vol. 9, No. 4, (Aug. 31, 2020), 325-335.
Miller, John, "Cappella Establishing Multi-User Augmented Reality Sessions Using Inertial Estimates and Peer-to-Peer Ranging", 21st ACM IEEE International Conference On Information Processing In Sensor Networks (IPSN), IEEE, (May 4, 2022), 428-440.
Ran, Xukan Xran, "Multi-user augmented reality with communication efficient and spatially consistent virtual objects", Proceedings Of The IEEE ACM 42nd International Conference On Software Engineering Workshops, Acmpub27, New York, NY, USA,, (Nov. 23, 2020), 386-398.
"U.S. Appl. No. 17/248,981, Non Final Office Action mailed Sep. 30, 2021", 30 pgs.
"U.S. Appl. No. 17/248,981, Response filed Dec. 20, 2021 to Non Final Office Action mailed Sep. 30, 2021", 11 pgs.
"U.S. Appl. No. 17/248,981, Notice of Allowance mailed Feb. 16, 2022", 12 pgs.
"International Application Serial No. PCT US2021 049672, Invitation to Pay Additional Fees mailed Jan. 14, 2022", 15 pgs.
"International Application Serial No. PCT US2021 049672, Written Opinion mailed Mar. 9, 2022", 15 pgs.
"International Application Serial No. PCT U82021 049672, Written Opinion mailed Mar. 9, 2022", 15 pgs.
"U.S. Appl. No. 17/895,449, Non Final Office Action mailed Jun. 8, 2023", 9 pgs.
"U.S. Appl. No. 17/895,449, Response filed Aug. 16, 2023 to Non Final Office Action mailed Jun. 8, 2023", 10 pgs.
"Bitmoji Customize text", [Online] Retrieved from the Internet: URL: https: web.archive.org web 20210225200456 https: support. bitmoji.com hc en-us articles 360034632291-Customize-Text-on-Bitmoji-Stickers, (captured Feb. 25, 2021), 3 pgs.
"Bitmoji Chrome Extension", [Online] Retrieved from the Internet: URL: https: web.archive.org web 20200919024925 https: support. bimoji.com hc en-us articles 360001494066, (Sep. 19, 2020), 5 pgs.
"Bitmoji", Snapchat Support, [Online] Retrieved from the Internet: URL: https: web.archive.org web 20190503063620 https: support. snapchat.com en-US a bitmoji, (captured May 3, 2019), 2 pgs.
"Manage Your Bitmoji", Snapchat Support, [Online] Retrieved from the Internet: URL: https: web.archive.org web 20190503063620 https: support.snapchat.com en-US a manage-bitmoji, (captured May 3, 2019), 3 pgs.
"Bitmoji Family", Snapchat Support, [Online] Retrieved from the Internet: URL: https: web.archive. org web 20190503063620 https: support.snapchat.com en-US article bitmoji-family, (captured May 3, 2019), 4 pgs.
"Your Own Personal Emoji", Bitstrips Inc, [Online] Retrieved from the Internet: URL: https: web.archive. org web 20150205232004 http: bitmoji.com , (captured Feb. 5, 2015), 3 pgs.
"Instant Comics Starring You and Your Friends", Bitstrips Inc, [Online] Retrieved from the Internet: URL: https: web.archive.org web 20150206000940 http: company.bitstrips.com bitstrips-app. html, (captured Feb. 6, 2015), 3 pgs.
Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.
Constine, Josh, "Snapchat launches Bitmoji merch and comic strips starring your avatar", TechCrunch, [Online] Retrieved from the Internet: URL: https: techcrunch.com 2018 11 13 bitmoji-store , (Nov. 13, 2018), 16 pgs.
Constine, Josh, "Snapchat Launches Bitmoji TV: Zany 4-min Cartoons of Your Avatar", TechCrunch, [Online] Retrieved from the Internet: URL: https: techcrunch. com 2020 01 30 bitmoji-tv , (Jan. 30, 2020), 13 pgs.

(56) References Cited

OTHER PUBLICATIONS

Macmillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100-million-1458876017, (Mar. 25, 2016), 5 pgs.

Newton, Casey, "Your Snapchat friendships now have their own profiles—and merchandise", The Verge, [Online] Retrieved from the Internet: URL: https: www.theverge. com 2018 11 13 18088772 snapchat-friendship-profiles-bitmoji-merchandise-comics, (Nov. 13, 2018), 5 pgs.

Ong, Thuy, "Snapchat takes Bitmoji deluxe with hundreds of new customization options", The Verge, [Online] Retrieved from the Internet on 11 02 2018: URL: https: www.theverge.com 2018 1 30 16949402 bitmoji-deluxe-snapchat-customization, (Jan. 30, 2018), 2 pgs.

Reign, Ashley, "How To Add My Friend's Bitmoji To My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.

Tumbokon, Karen, "Snapchat Update: How To Add Bitmoji To Customizable Geofilters", International Business Times, [Online] Retrieved from the Internet : URL: https: www.ibtimes.com snapchat-update-how-add-bitmoji-customizable-geofilters-2448152, (Nov. 18, 2016), 6 pgs.

\* cited by examiner

SECURE PEER-TO-PEER CONNECTIONS BETWEEN MOBILE DEVICES

TECHNICAL FIELD

The present disclosure relates generally to communications between mobile devices, and more particularly to establishing a secure peer-to-peer connection between mobile devices.

BACKGROUND

Establishing a secure communications link between mobile devices located nearby usually involves a formidable setup process for non-technical people. Some solutions, like Apple Airdrop, use Bluetooth advertising to identify mobile devices in the area. If a user wants to share a file, a list of potential recipients in the area is displayed.

The use of Bluetooth advertising and the associated exchange of information is a possible security risk, and users are also required to specifically enable or disable the file sharing functionality to allow all, none, or contacts' compatible devices in the area to make an initial connection and sharing request. Also, proprietary implementations such as Airdrop have limited use outside their ecosystems.

Additionally, when pairing devices based on Bluetooth advertising, a list of available devices is initially presented to the user for manual selection. Knowing which device to select from the list can be challenging, particularly if there is more than one device of the same make and model.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
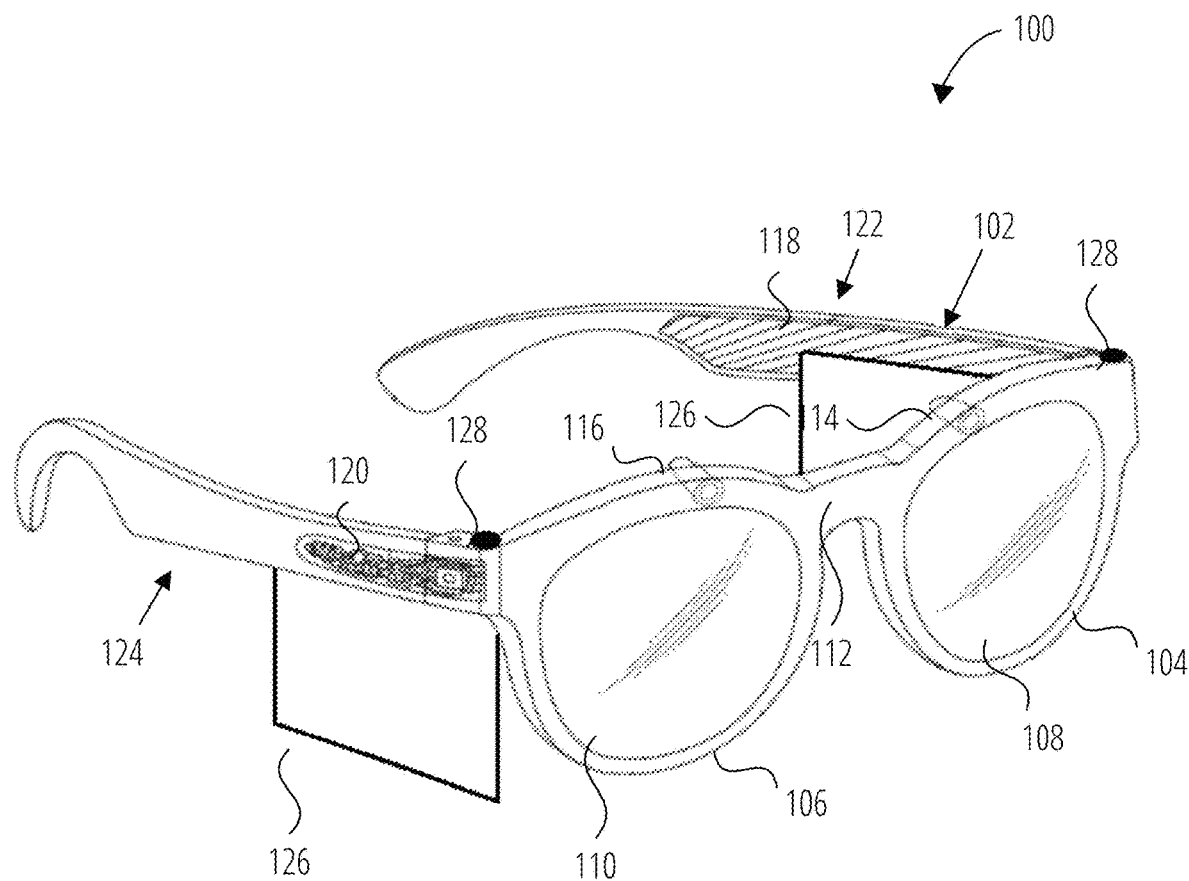
FIG. 1 is a perspective view of a head-worn device, in accordance with some examples.

In some examples, establishment of a secure peer-to-peer connection between mobile devices is enabled by displaying a QR code on the display of a first mobile device. The QR code is scanned by a second mobile device, which then establishes a connection with the first mobile device based on information encoded in the QR code. In some cases, the first mobile device is a smartphone and the second mobile device is a head-worn augmented reality (AR) device.

A QR code is a machine-readable optical label that can contain information about the item to which it is attached. QR codes are used widely to share small amount of data between mobile devices. For instance, some messaging applications uses a QR code to quickly allow the user displaying the QR code to be quickly added as a "friend" of the user of the scanning mobile device. QR codes are also often encoded with an URL, which allows the mobile device to retrieve additional information from a remote server.

As disclosed herein, the QR code displayed on the second device includes Bluetooth Low Energy (BLE) address information that can be used to establish a BLE communications link between the two devices in an ad hoc connection, without requiring any further setup. In the traditional establishment of a Bluetooth connection, a device is initially selected from a list of available devices, and is thus indicated as trusted, by the user of a mobile device. Static address and other information for the selected Bluetooth device is then stored in the memory of the mobile device in a process known as bonding. Bonding is the exchange of long-term keys after pairing occurs, and storing those keys for later use. Bonding creates a persistent security relationship between the two devices. Bonding assists in the reestablishment of connections between trusted devices, since the trusted devices have already been designated as such.

Using a scan of a QR code displayed on one device to pair the two devices avoids the requirement for bonding to occur or have occurred, since the user will presumably only scan a QR code on a mobile device with which a connection is intended (that is, a device that is trusted by the user). The Bluetooth addresses used can be dynamic, since there is no need to rely on an address for a paired device that has previously been stored in memory, and thus is required to be static to permit the connection. In some cases, a "confirm connection" user interface prompt can be provided on both devices, to guard against accidental scanning, which is in any event unlikely.

In some examples, provided is a computer-implemented method, executed by a first mobile device, for establishing a communication link between the first mobile device and a second mobile device, the method includes capturing, by the first mobile device, an image of a machine-readable code displayed on the second mobile device, decoding, by the first mobile device, communication setup information from the captured image of the machine-readable code, and establishing a communication link with the second mobile device using the communication setup information. The communication setup information may be dynamically generated.

The computer-implemented method may also include transmitting a message advertising at least part of the communication setup information, and/or scanning for a message from the second mobile device, advertising at least part of the communication setup information.

In some examples, the method may include determining a transformation of a fiducial marker displayed by the second mobile device, receiving information specifying a pose of the second mobile device, determining a relative pose between the first mobile device and the second mobile device using the transformation and the information specifying the pose of the second mobile device, and aligning a coordinate system between the first mobile device and the second mobile device. The machine-readable code may be the fiducial marker. Information specifying the pose of the second mobile device may be encoded in the machine-readable code.

The method may also include receiving updates to the information specifying the pose of the second mobile device via the communication link, and performing user interface actions on the first mobile device based on the received updates to the information specifying the pose of the second mobile device.

In some examples, provided is a non-transitory computer-readable storage medium, the computer-readable storage medium including instructions that when executed by executed by a first mobile device, cause the first mobile device to perform operations for establishing a communication link between the first mobile device and a second mobile device according to any of the methods and limitations described above, the operations including but not limited to capturing, by the first mobile device, of an image of a machine-readable code displayed on the second mobile device, decoding, by the first mobile device, communication setup information from the captured image of the machine-readable code, and establishing a communication link with the second mobile device using the communication setup information.

In some examples, provided is a computing apparatus includes a processor and a memory storing instructions that, when executed by the processor, configure the apparatus to perform operations for establishing a communication link between a first mobile device and a second mobile device according to any of the methods and limitations described above, the operations including but not limited to capturing, by the first mobile device, of an image of a machine-readable code displayed on the second mobile device, decoding, by the first mobile device, communication setup information from the captured image of the machine-readable code, and establishing a communication link with the second mobile device using the communication setup information.

Other technical features may be readily apparent to one skilled in the art from the following figures, descriptions, and claims.

FIG. 1 is a perspective view of a head-worn AR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 302 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
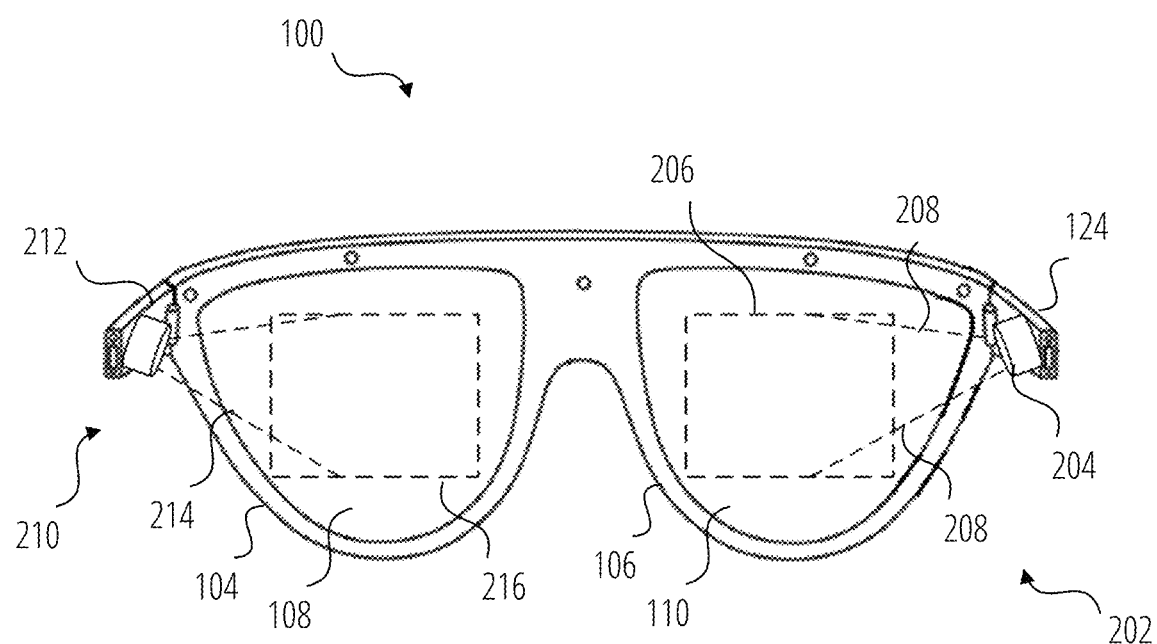
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using a touchpad 126 and/or the buttons 128, voice inputs or touch inputs on an associated device (e.g., user device 328 illustrated in FIG. 3), and/or hand movements, locations, and positions detected by the glasses 100.

Figure 3:
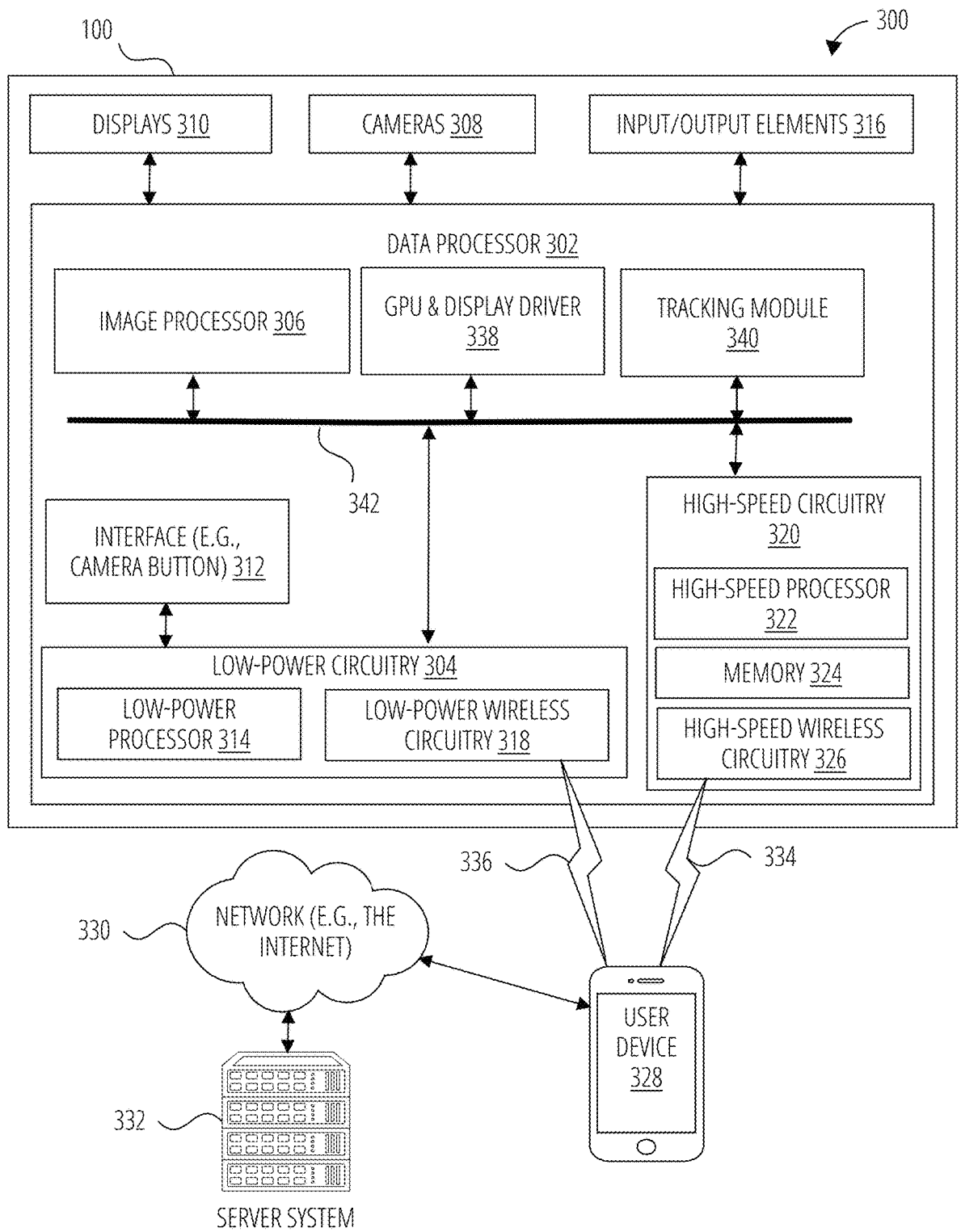
FIG. 3 is a block diagram illustrating a networked system including details of the head-worn device of FIG. 1, in accordance with some examples.

FIG. 3 is a block diagram illustrating a networked system 300 including details of the glasses 100, in accordance with some examples. The networked system 300 includes the glasses 100, a user device 328, and a server system 332. The user device 328 may be a smartphone, tablet, phablet, laptop computer, access point, or any other such device capable of connecting with the glasses 100 using a low-power wireless connection 336 and/or a high-speed wireless connection 334. The user device 328 is connected to the server system 332 via the network 330. The network 330 may include any combination of wired and wireless connections. The server system 332 may be one or more computing devices as part of a service or network computing system. The user device 328 and any elements of the server system 332 and network 330 may be implemented using details of the software architecture 1004 or the machine 1100 described in FIG. 10 and FIG. 11 respectively.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 10 and FIG. 11. For example, the input/output elements 316 may include any of I/O components 1106 including output components 1128, motion components 1136, and so forth. Examples of the displays 310 are discussed in FIG. 2. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the user device 328.

The image processor 306 includes circuitry to receive signals from the cameras 308 and process those signals from the cameras 308 into a format suitable for storage in the memory 324 or for transmission to the user device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the user device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 1012 of FIG. 10. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE)

802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates the position and orientation (the "pose") of the glasses 100. For example, the tracking module 340 uses image data and corresponding inertial data from the cameras 308 and the position components 1140, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the user device 328, or on a remote server. For example, one or more functions or operations described herein may be performed by one of the applications 1006 such as messaging application 1046.

Figure 4:
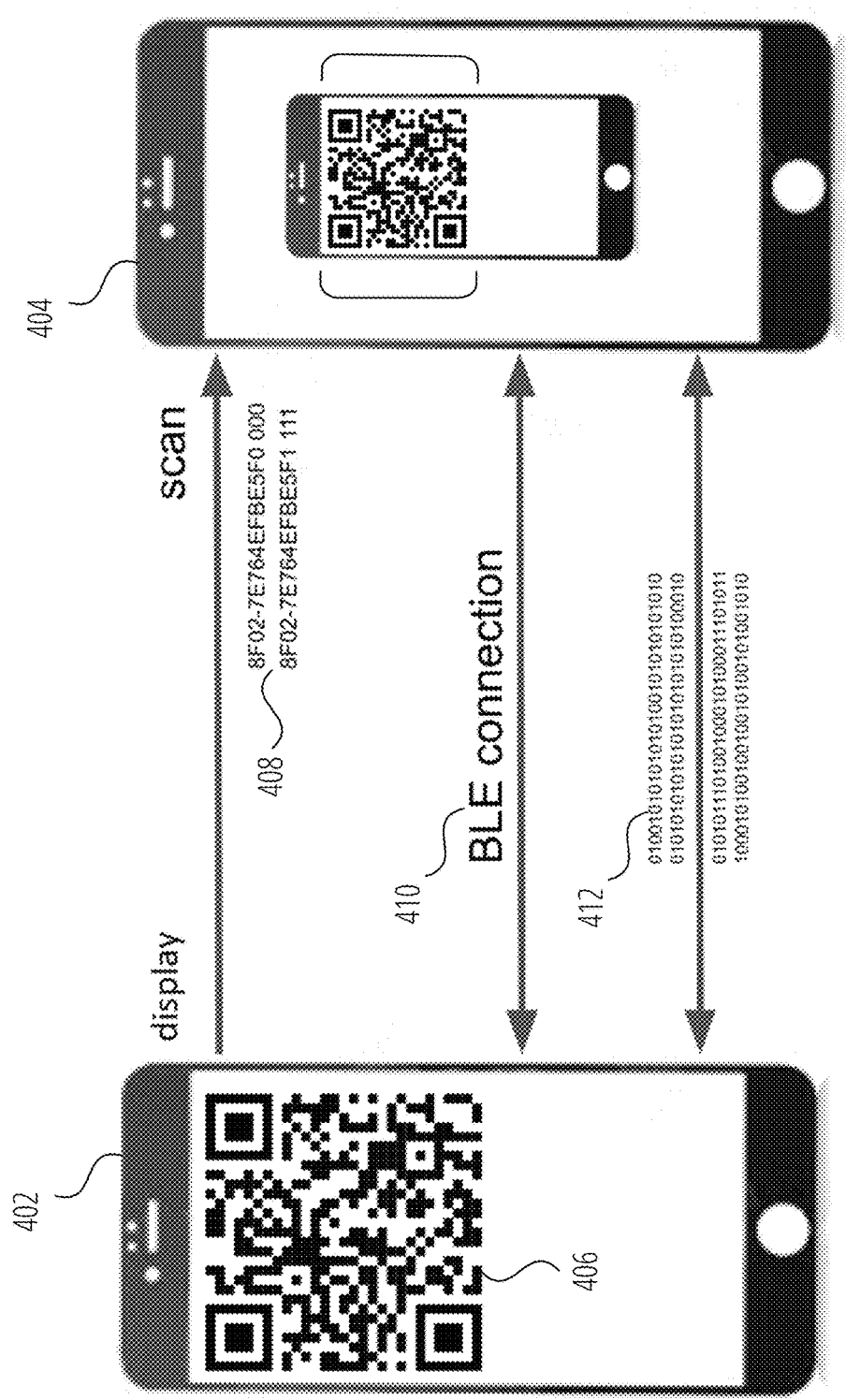
FIG. 4 is an elementary process flow diagram illustrating the establishment of a peer-to-peer Bluetooth communications link according to some examples.

FIG. 4 is an elementary process flow diagram illustrating the establishment of a peer-to-peer Bluetooth communications link according to some examples. As can been seen in the figure, a QR code 406 is displayed by a first mobile device 402. The QR code 406 has Bluetooth address information 408 encoded therein, which has been dynamically generated. The QR code is scanned and decoded by a second mobile device 404. Using the address information 408, the second mobile device 404 initiates a Bluetooth communications link 410 with the first mobile device 402. The Bluetooth communications link 410 enables the exchange of data 412 between the two devices. Further details of the method are discussed below with reference to FIG. 5. The first mobile device 402, which displays the QR code, normally assumes the central role in the Bluetooth session, while the second mobile device 404 assumes a peripheral role, although this is not required.

The address information 408, comprises dynamically-generated BLE services/characteristic UUIDs (Universal Unique Identifiers), which are used to set up the communications link. The address information 408 is thus unique, and is explicitly defined in each application running on each mobile device. Conventionally, if two or more people in the same area are wearing glasses 100 and both are trying to connect their glasses 100 to their user devices 328, conflicts would be incurred. The current method avoids this problem, allowing all users in the same area to have a unique and secure communications link between their own devices.

Figure 5:
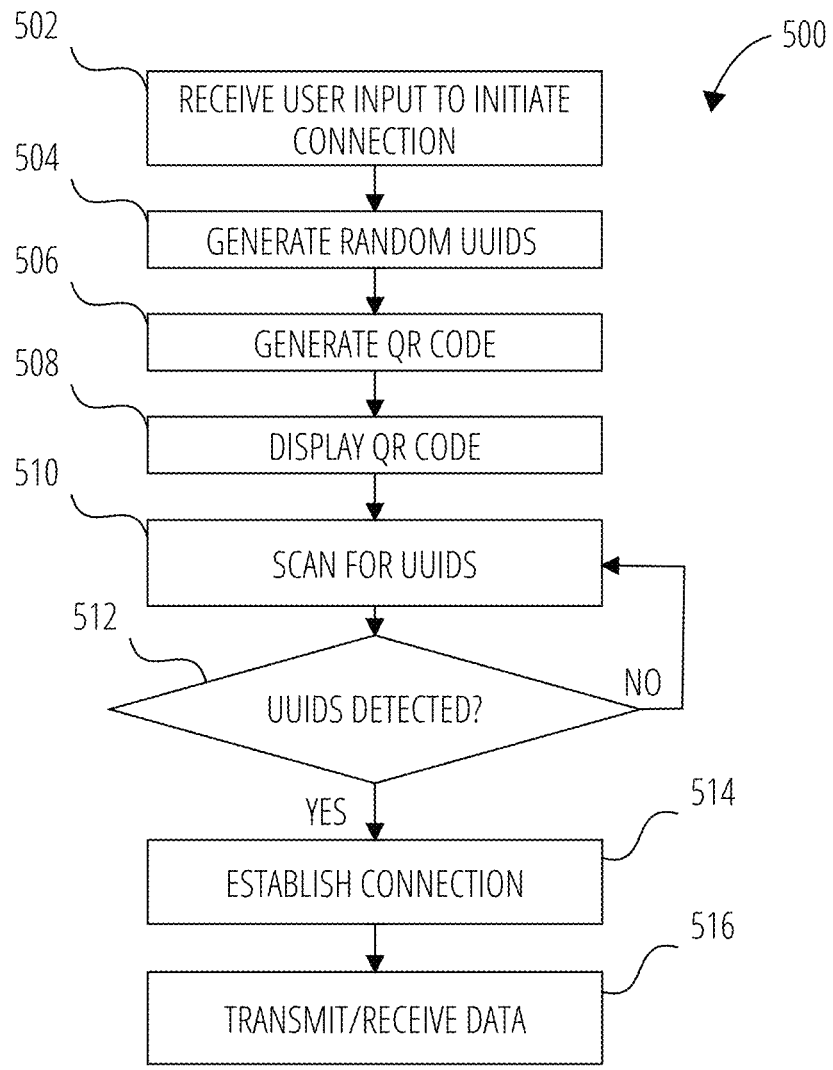
FIG. 5 is a flowchart illustrating part of a method of establishing a peer-to-peer Bluetooth communications link according to some examples.

FIG. 5 is a flowchart 500 illustrating part of a method of establishing a peer-to-peer Bluetooth communications link according to some examples, executing on the first mobile device 402. For explanatory purposes, the operations of the flowchart 500 are described herein as occurring in serial, or linearly. However, multiple operations of the flowchart 500 may occur in parallel. In addition, the operations of the flowchart 500 need not be performed in the order shown and/or one or more blocks of the flowchart 500 need not be performed and/or can be replaced by other operations.

The method commences at operation 502, with the first mobile device 402 receiving user input to initiate a Bluetooth communications link with another device. In response, in operation 504, the first mobile device 402 generates random UUIDs as BLE services/characteristics IDs. In operation 506, the first mobile device 402 generates a QR code embodying the UUIDs and displays it in operation 508. The first mobile device 402 then commences scanning for the UUIDs, to be advertised in a message transmitted by the second mobile device 404, using its Bluetooth transceiver.

If the UUIDs are not detected in operation 512, the method returns to operation 510 and the first mobile device 402 continues scanning for a message advertising at least some of the UUIDs, transmitted by the second mobile device 404. If the UUIDs are detected in operation 512, then the first mobile device 402 responds to the second mobile device 404 and establishes a secure Bluetooth communications link in operation 514. The first mobile device 402 then exchanges data with the second mobile device 404 in operation 516.

Figure 6:
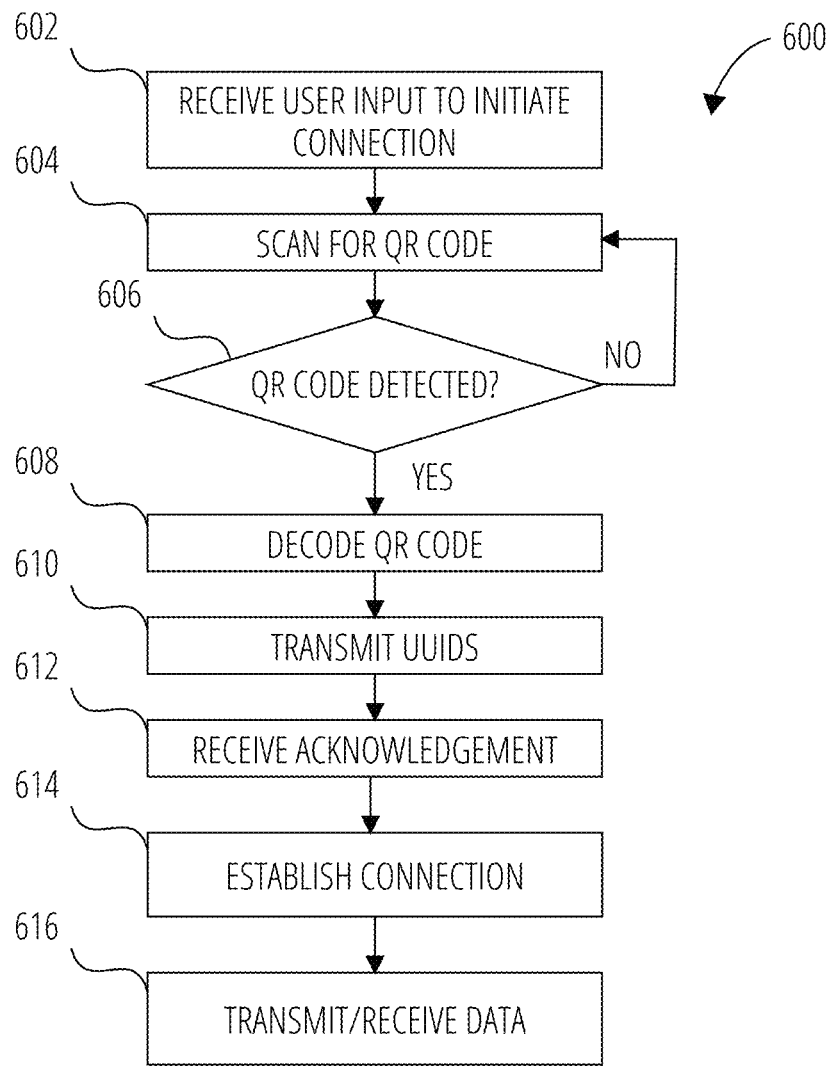
FIG. 6 is a flowchart illustrating part of a method of establishing a peer-to-peer Bluetooth communications link according to some examples.

FIG. 6 is a flowchart 600 illustrating part of a method of establishing a peer-to-peer Bluetooth communications link according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations.

The method commences at operation 602, with the second mobile device 404 receiving user input to initiate a Bluetooth communications link with another device. In response, the second mobile device 404 begins scanning a video feed from a camera in the second mobile device 404, in operation 604.

If a QR code is not detected in operation 606, the method returns to operation 604 and the second mobile device 404 continues scanning for a QR code. If a QR code is detected in operation 606, then the second mobile device 404 decodes the QR code in operation 608, to extract the UUIDs reflected therein. In operation 610 the second mobile device 404 transmits a message advertising at least some of the decoded UUIDs using its Bluetooth transceiver. In operation 612, the second mobile device 404 receives an acknowledging transmission from the first mobile device 402 in response to the message, establishes the Bluetooth communications link in operation 614, and begins to exchange data in operation 616.

It will be appreciated that operations 510 and 512 in FIG. 5 (scanning for the UUIDS) can be performed by the second mobile device 404 in flowchart 600, instead of transmitting the UUIDS in operations 610 and 612, while the first mobile device 402 in the flowchart 500 can transmit the UUIDS as in operations 610 and 612 in FIG. 6, instead of scanning for the UUIDS as in operations 510 and 512.

As mentioned above, in the flowcharts 500 and 600, the first mobile device 402, which displays the QR, normally assumes the central role in the Bluetooth session, while the second mobile device 404 assumes a peripheral role, although this is not required.

Depending on the application, additional mobile devices could scan the QR code 406 displayed by the first mobile device 402 to establish communications links as peripherals to the first mobile device 402, functioning in a central role. Alternatively, multiple mobile devices could be joined together in a BLE mesh topology.

Figure 7A:
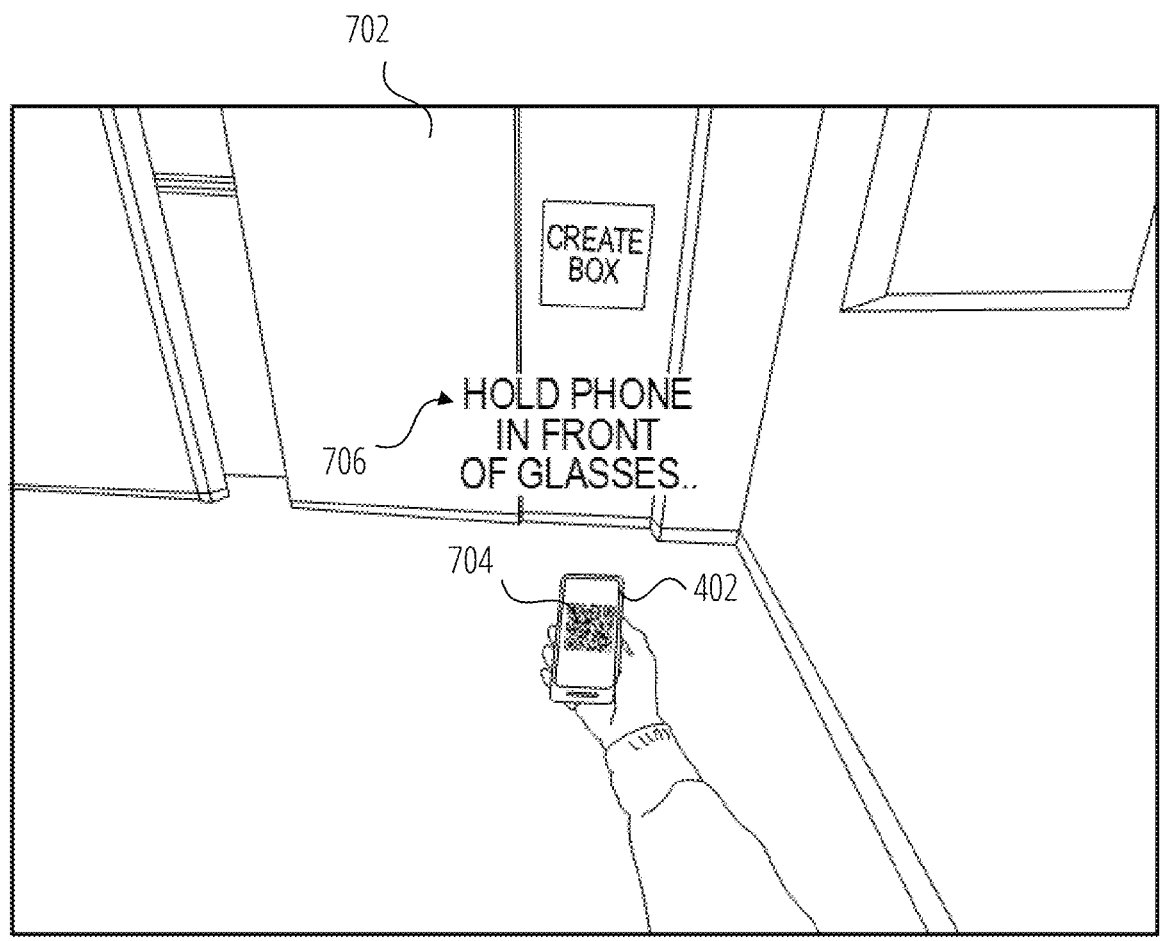
FIG. 7A is view of an environment through a user's glasses, in which the first mobile device is displaying a QR code, according to some examples.

FIG. 7A is view of an environment 702 through a user's glasses 100, in which the first mobile device 402 is displaying a QR code 704, according to some examples. In this case, in addition to the first mobile device 402 and the glasses 100 (as the second mobile device) performing the methods of FIG. 5 and FIG. 6, the QR code 704 is also being used to align the coordinate systems of both devices.

Both the first mobile device 402 and the glasses 100 performing visual-inertial odometry, to determine and keep track of their respective positions and orientations ("poses") within the environment 702. A relative pose between the glasses 100 and the first mobile device 402 can be determined by having the glasses 100 take an image of a fiducial marker. In this case, the QR code is functioning as a fiducial marker in addition to providing information for establishing the communications link. Since the shape and correct orientation of the fiducial marker is known, the glasses 100 can determine a pose transformation between the captured image of the fiducial marker and the actual fiducial marker.

In some examples, the pose of the first mobile device 402 can be encoded in the QR code 704, so that the glasses 100 can capture an image of the QR code 704, determine the transformation of the image of the QR code 704, and determine the relative pose between the first mobile device 402 and the glasses 100. In other examples, the pose of the first mobile device 402 is reported to the glasses 100 via the Bluetooth communications link 410 after it has been established, while continuing to display the QR code. The glasses 100 can then capture an image of the QR code and a current pose of the first mobile device 402 almost simultaneously. The latter method is less sensitive to movement of the first mobile device 402 that might occur after a QR code including the pose of the mobile device has been generated but before it has been captured by the glasses 100.

The determined transformation will provide a relative pose between the first mobile device 402 and the glasses 100. Either or both of the coordinate systems of the first mobile device 402 and the glasses 100 can then be adjusted so that the poses of both devices are represented in the same coordinate system. The first mobile device 402 then reports its pose and touch inputs through the Bluetooth communications link 410 to the glasses 100.

Also shown in FIG. 7A is a text prompt 706, displayed by the glasses 100 to the user, instructing them to hold the phone in front of the glasses 100 so that the QR code 406 can be imaged and decoded.

Figure 7B:
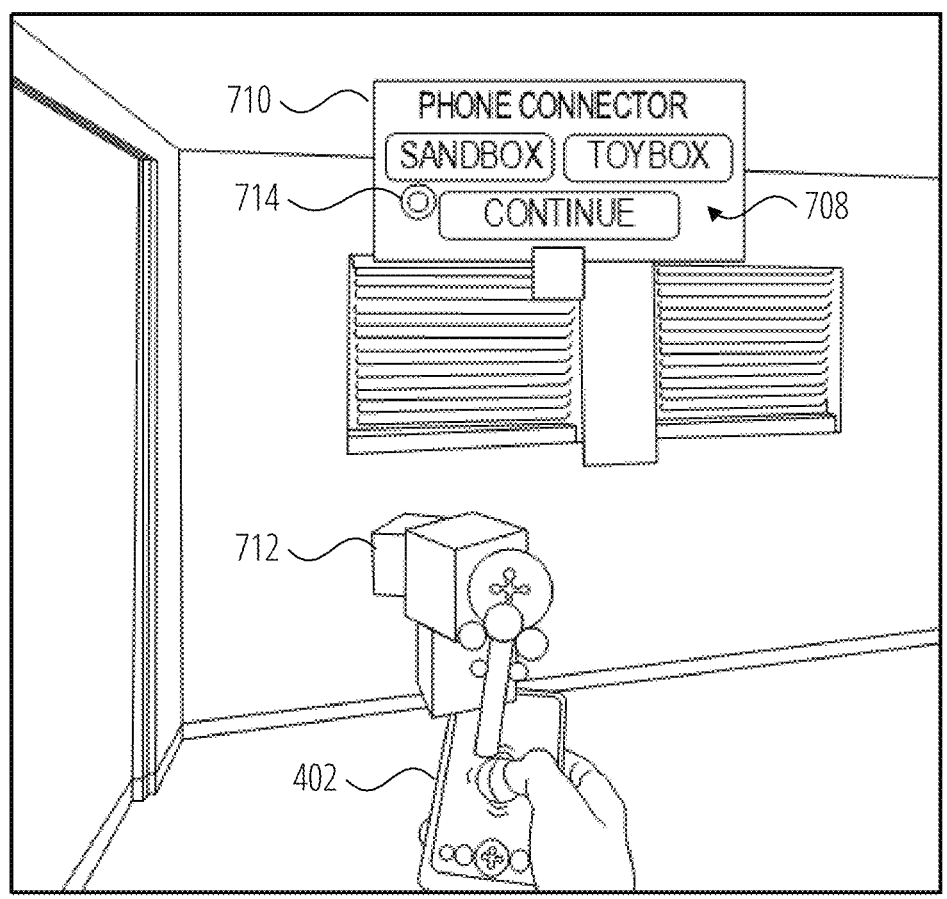
FIG. 7B is view of an environment through a user's glasses, in which the first mobile device is functioning as an input device for the glasses, according to some examples.

FIG. 7B is view of an environment 702 through a user's glasses 100, in which the first mobile device 402 is functioning as an input device for the glasses 100, according to some examples. In FIG. 7B, a Bluetooth communications link has been established and the coordinate systems of the two devices aligned as described above. The first mobile device 402 is reporting its pose and any user touch inputs received, to the glasses 100 through the Bluetooth communications link 410.

As shown, the first mobile device 402 is displaying user interface elements 708, including a directional touchpad that for example can be used to move a cursor 714 displayed by the glasses 100. Also shown is a user interface window 710 that is being displayed by the glasses 100.

Using a combination of touch inputs and gestures using the first mobile device 402, a user can interact with augmented reality elements displayed by the glasses, such as AR elements 712 and the window 710. For example, using the directional touchpad shown on the touchscreen of the first mobile device 402, a user can place the cursor 714 over the window 710. A button shown in the window can then be activated with a single touch on the touchscreen of the first mobile device 402, or the window can be moved within the field of view of the glasses 100 by pressing and holding on the touchscreen and then pointing the first mobile device 402 towards an intended location of the window 710.

The first mobile device 402 thus functions as a six degree of freedom controller, with touch input, for the glasses 100. This alleviates some of the challenges of providing a user interface on the glasses 100.

Figure 8:
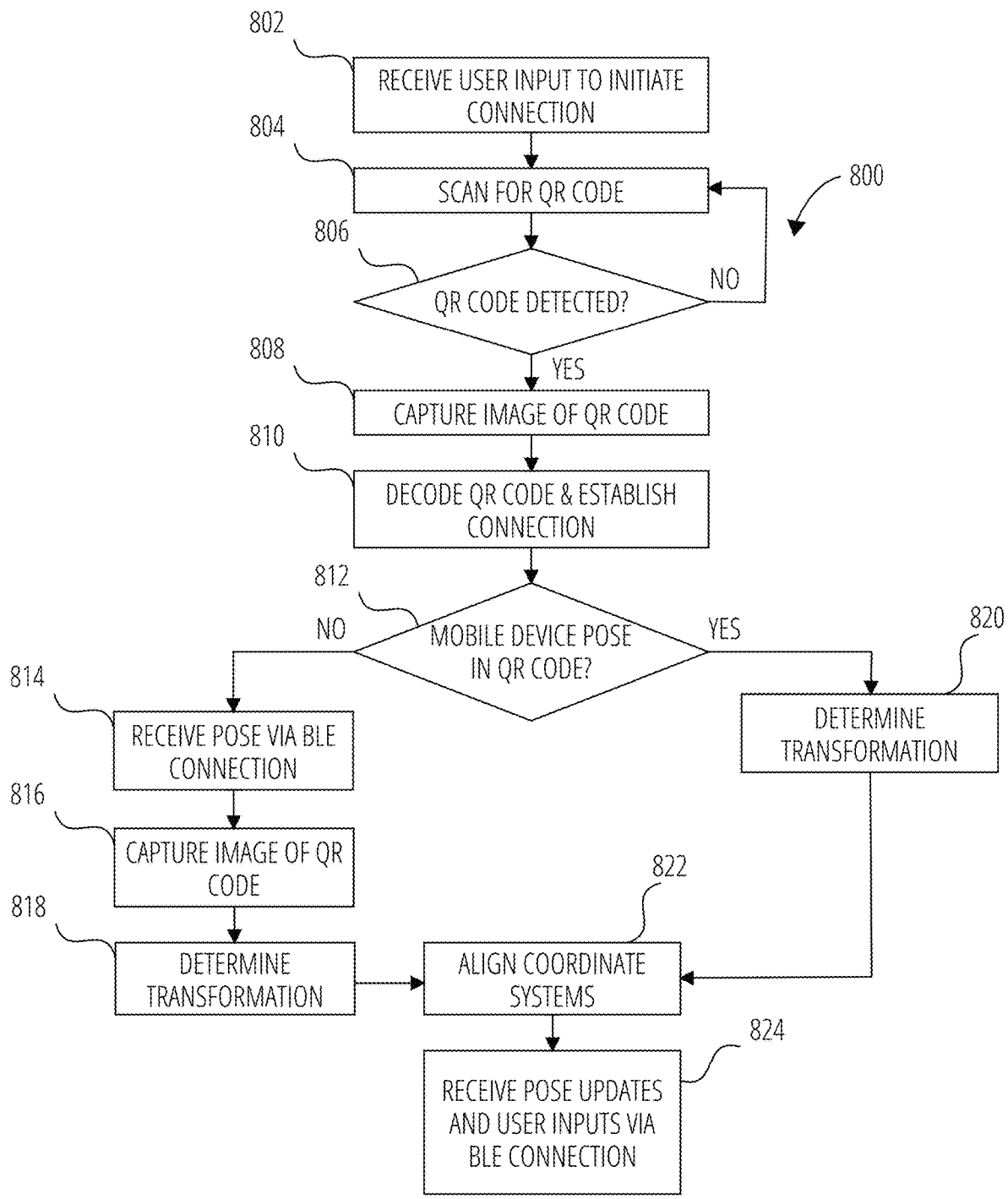
FIG. 8 is a flowchart illustrating part of a method of establishing a peer-to-peer Bluetooth communications link and aligning coordinate systems, according to some examples.

FIG. 8 is a flowchart 800 illustrating part of a method of establishing a peer-to-peer Bluetooth communications link and aligning coordinate systems, according to some examples. For explanatory purposes, the operations of the flowchart 800 are described herein as occurring in serial, or linearly. However, multiple operations of the flowchart 800 may occur in parallel. In addition, the operations of the flowchart 800 need not be performed in the order shown and/or one or more blocks of the flowchart 800 need not be performed and/or can be replaced by other operations.

The method commences at operation 802, with the glasses 100 receiving user input to initiate a Bluetooth communications link with another device. In response, the glasses 100 begin scanning a video feed from a camera in the glasses 100, in operation 804.

If a QR code is not detected in operation 806, the method returns to operation 804 and the glasses 100 continue scanning for a QR code. If a QR code is detected in operation 806 then the glasses 100 capture an image of the QR code in block 808, decode the QR code, and establish a Bluetooth communications link as in flowchart 600, in operation 810.

In operation 812, if the QR code includes information specifying the pose of the first mobile device 402 then the method proceeds to block 820, where a transformation is determined between the captured image of the QR code and an undistorted version of the QR code. The method then proceed to operation 822.

If the QR code does not include information specifying the pose of the first mobile device 402 in operation 810, then in operation 814, pose information is transmitted from the first mobile device 402 and received by the glasses 100. The glasses 100 capture an image of the QR code in operation 816, and then determines a transformation between the captured image of the QR code and an undistorted version of the QR code in operation 818. The method then proceed to operation 822, where the glasses 100 align the coordinate systems as described above.

The glasses 100 continue to receive transmissions of pose updates and user inputs from the first mobile device 402 via the Bluetooth communications link. The pose updates and user inputs are used by the glasses 100 in operation 824 as inputs from an up to six degree of freedom controller as mentioned above.

Also as mentioned above, in the flowcharts 500 and 800, the first mobile device 402, which displays the QR, normally assumes the central role in the Bluetooth session, while the glasses 100 assume a peripheral role, although this is not required.

Depending on the application, additional mobile devices could scan the QR code 406 displayed by the first mobile device 402 to establish communications links as peripherals to the first mobile device 402, functioning in a central role. Pose updates and user inputs then received on the first mobile device 402 can be provided to multiple glasses 100 or mobile devices.

Figure 9:
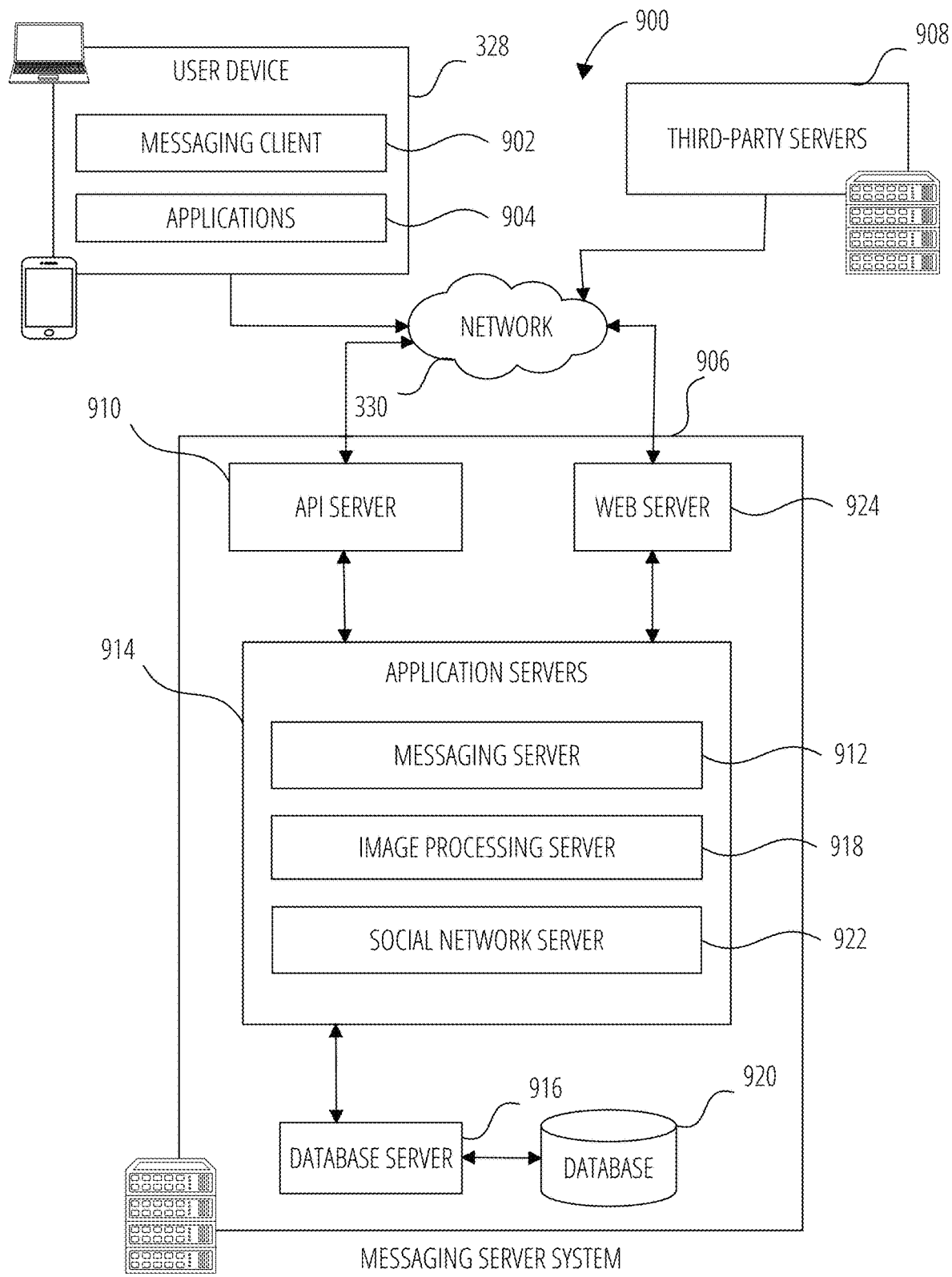
FIG. 9 is a diagrammatic representation of a networked environment in which the present disclosure may be deployed, in accordance with some examples.

FIG. 9 is a block diagram showing an example messaging system 900 for exchanging data (e.g., messages and associated content) over a network. The messaging system 900 includes multiple instances of a user device 328 which host a number of applications, including a messaging client 902 and other applications 904. A messaging client 902 is communicatively coupled to other instances of the messaging client 902 (e.g., hosted on respective other user devices 328), a messaging server system 906 and third-party servers 908 via a network 330 (e.g., the Internet). A messaging client 902 can also communicate with locally-hosted applications 904 using Application Program Interfaces (APIs).

A messaging client 902 is able to communicate and exchange data with other messaging clients 902 and with the messaging server system 906 via the network 330. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 330 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a user device 328 has sufficient processing capacity.

The messaging server system 906 supports various services and operations that are provided to the messaging client 902. Such operations include transmitting data to, receiving data from, and processing data generated by the messaging client 902. This data may include message content, user device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914, and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the user device 328 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a user device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the user device 328, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 10:
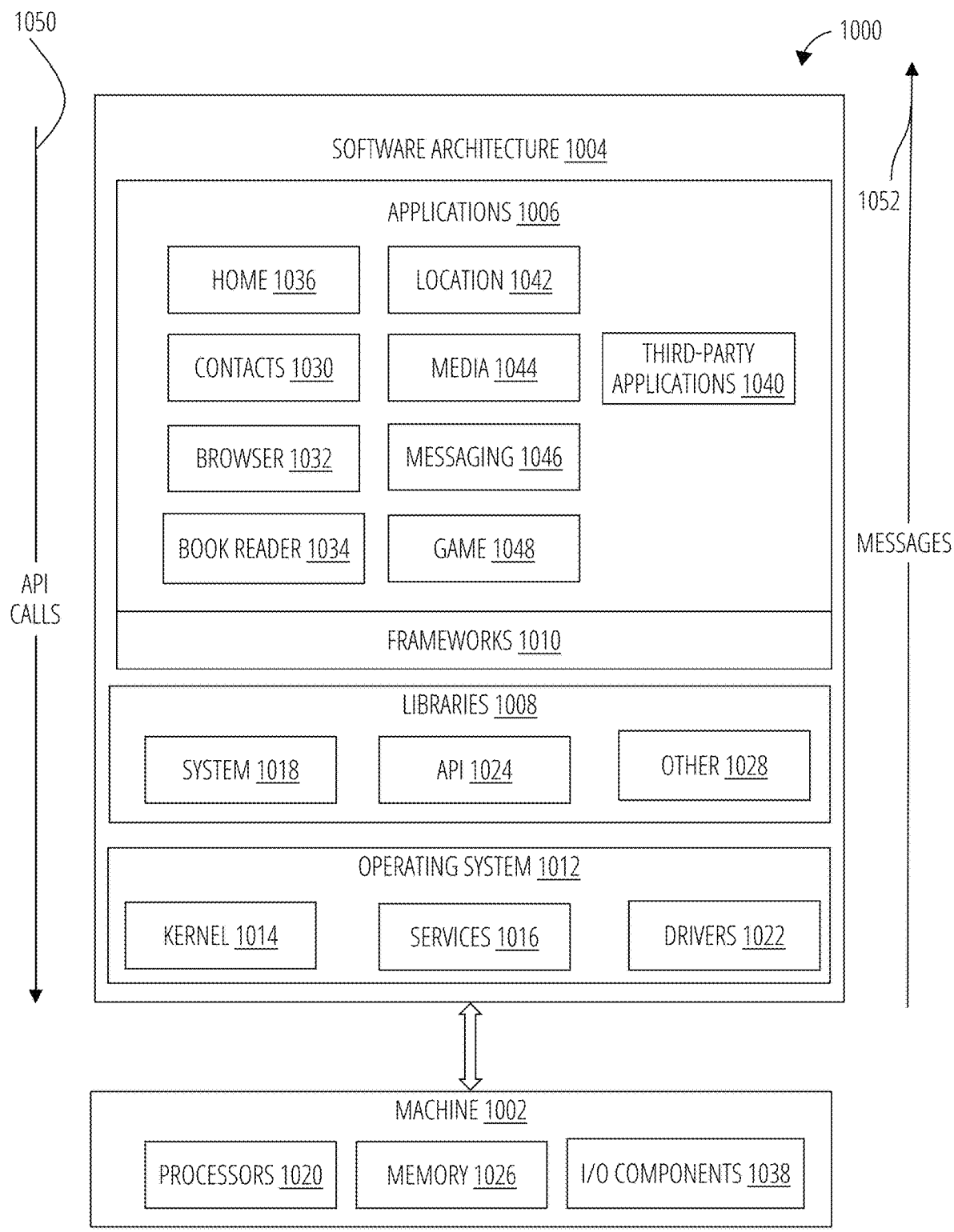
FIG. 10 is a block diagram showing a software architecture within which the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where individual layers provides a particular functionality. The software architecture 1004 includes layers such as an operating system 1012, libraries 1008, frameworks 1010, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1008 provide a low-level common infrastructure used by the applications 1006. The libraries 1008 can include system libraries 1018 (e.g., C standard library) that provide functions such as memory allocation functions, string manipulation functions, mathematic functions, and the like. In addition, the libraries 1008 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 1008 can also include a wide variety of other libraries 1028 to provide many other APIs to the applications 1006.

The frameworks 1010 provide a high-level common infrastructure that is used by the applications 1006. For example, the frameworks 1010 provide various graphical user interface (GUI) functions, high-level resource management, and high-level location services. The frameworks 1010 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as third-party applications 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party applications 1040 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1040 can invoke the API calls 1050 provided by the operating system 1012 to facilitate functionality described herein.

Figure 11:
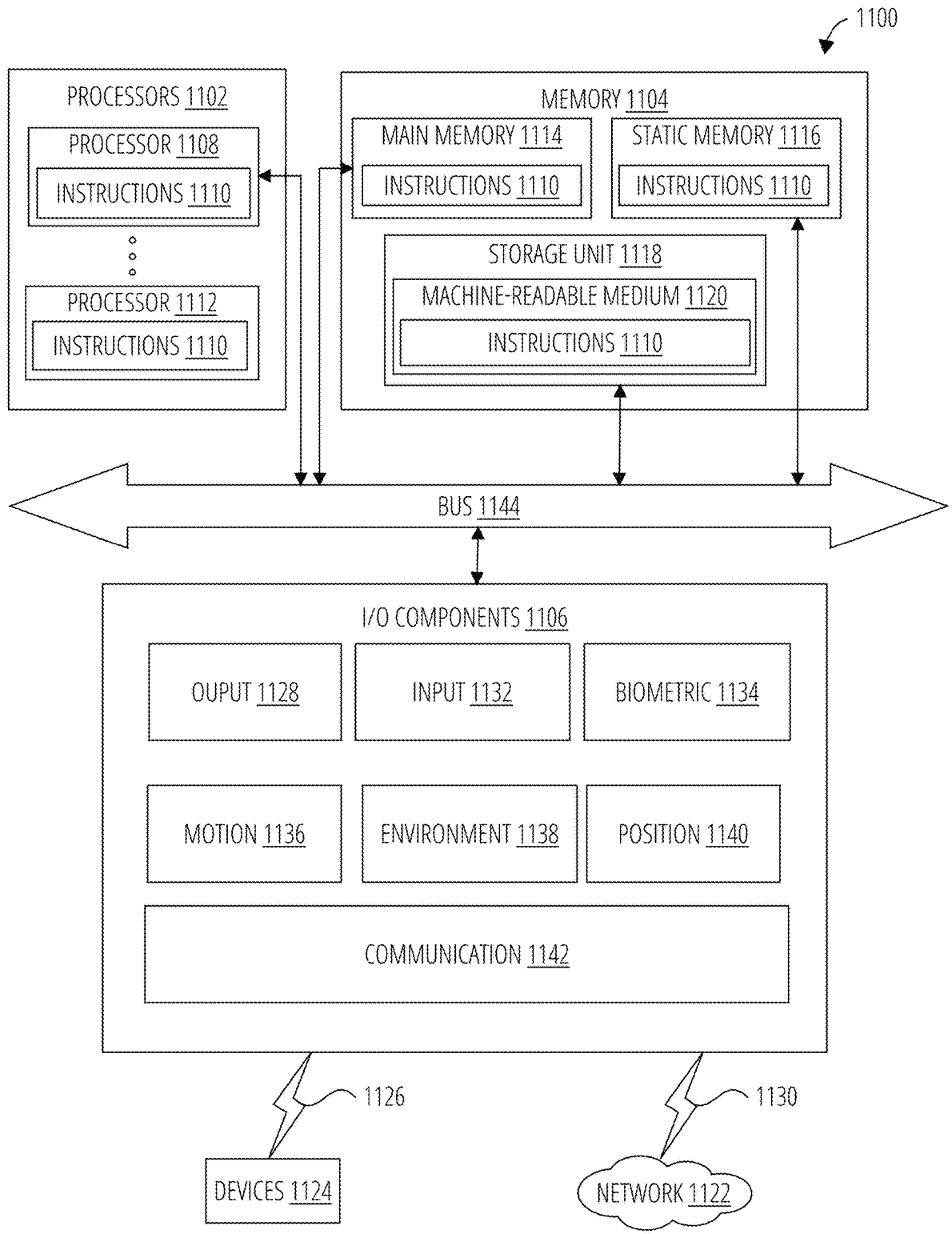
FIG. 11 is a diagrammatic representation of a machine, in the form of a computer system within which a set of instructions may be executed for causing the machine to perform any one or more of the methodologies discussed herein in accordance with some examples.

FIG. 11 is a diagrammatic representation of a machine 1100 or computing apparatus within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while a single machine 1100 is illustrated, the term "machine" may also be taken to include a collection of machines that individually or jointly execute the instructions 1110 to perform any one or more of the methodologies discussed herein.

The machine 1100 may include processors 1102, memory 1104, and I/O components 1106, which may be configured to communicate with one another via a bus 1144. In an example, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1114, a static memory 1116, and a storage unit 1118, both accessible to the processors 1102 via the bus 1144. The main memory 1104, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within one or more of the processors 1102 (e.g., within the processor's cache memory), or any suitable combination thereof, during execution thereof by the networked system 300.

The I/O components 1106 may include a wide variety of components to receive input, provide output, produce output, transmit information, exchange information, capture measurements, and so on. The specific I/O components 1106 that are included in a particular machine will depend on the type of machine. For example, portable machines such as mobile phones may include a touch input device or other such input mechanisms, while a headless server machine will likely not include such a touch input device. It will be appreciated that the I/O components 1106 may include many other components that are not shown in FIG. 11. In various examples, the I/O components 1106 may include output components 1128 and input components 1132. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1132 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1106 may include biometric components 1134, motion components 1136, environmental components 1138, or position components 1140, among a wide array of other components. For example, the biometric components 1134 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1136 include acceleration sensor components (e.g., accelerometer), gravitation sensor components, rotation sensor components (e.g., gyroscope), and so forth. The environmental components 1138 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1140 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1106 further include communication components 1142 operable to couple the networked system 300 to a network 1122 or devices 1124 via a coupling 1130 and a coupling 1126, respectively. For example, the communication components 1142 may include a network interface component or another suitable device to interface with the network 1122. In further examples, the communication components 1142 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1142 may detect identifiers or include components operable to detect identifiers. For example, the communication components 1142 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1142, such as location via Internet Protocol (IP) geolocation, location via Wi-Fi® signal triangulation, location via detecting an NFC beacon signal that may indicate a particular location, and so forth.

The various memories (e.g., memory 1104, main memory 1114, static memory 1116, and/or memory of the processors 1102) and/or storage unit 1118 may store one or more sets of instructions and data structures (e.g., software) embodying or used by any one or more of the methodologies or functions described herein. These instructions (e.g., the instructions 1110), when executed by processors 1102, cause various operations to implement the disclosed examples.

The instructions 1110 may be transmitted or received over the network 1122, using a transmission medium, via a network interface device (e.g., a network interface component included in the communication components 1142) and using any one of a number of well-known transfer protocols (e.g., hypertext transfer protocol (HTTP)). Similarly, the instructions 1110 may be transmitted or received using a transmission medium via the coupling 1126 (e.g., a peer-to-peer coupling) to the devices 1124.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "user device" or "client device" refers to any machine that interfaces to a communications network to obtain resources from one or more server systems or other user or client devices. A user or client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an Application Specific Integrated Circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" or "machine-storage medium" refers to a single or multiple non-transitory storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

The invention claimed is:

1. A computer-implemented method, executed by a first mobile device, for establishing a communication link between the first mobile device and a second mobile device, the method comprising:
   capturing, by the first mobile device, an image of a machine-readable code displayed on the second mobile device;
   decoding, by the first mobile device, communication setup information from the captured image of the machine-readable code;
   establishing a communication link with the second mobile device using the communication setup information;
   determining a relative pose between the first mobile device and the second mobile device by generating a pose transformation of fiducial markings displayed by the second mobile device;
   receiving information specifying updates to a pose of the second mobile device; and
   performing user interface actions on the first mobile device based on the received information specifying updates to the pose of the second mobile device.

2. The computer-implemented method of claim 1, wherein the communication setup information is dynamically generated.

3. The computer-implemented method of claim 1, further comprising:
   transmitting a message advertising at least part of the communication setup information.

4. The computer-implemented method of claim 1, further comprising:
   scanning for a message from the second mobile device, the message advertising at least part of the communication setup information.

5. The computer-implemented method of claim 1, further comprising:
   aligning a coordinate system between the first mobile device and the second mobile device based on the relative pose between the first mobile device and the second mobile device.

6. The computer-implemented method of claim 5, wherein the machine-readable code comprises the fiducial markings.

7. The computer-implemented method of claim 6, wherein information specifying the pose of the second mobile device is encoded in the machine-readable code.

8. The computer-implemented method of claim 1, wherein the updates to the information specifying the pose of the second mobile device are received by the first mobile device via the communication link.

9. A non-transitory computer-readable storage medium, the computer-readable storage medium including instructions that when executed by executed by a first mobile device, cause the first mobile device to perform operations for establishing a communication link between the first mobile device and a second mobile device, the operations comprising:

capturing, by the first mobile device, of an image of a machine-readable code displayed on the second mobile device;

decoding, by the first mobile device, communication setup information from the captured image of the machine-readable code;

establishing a communication link with the second mobile device using the communication setup information;

determining a relative pose between the first mobile device and the second mobile device by generating a pose transformation of fiducial markings displayed by the second mobile device;

receiving information specifying updates to a pose of the second mobile device; and performing user interface actions on the first mobile device based on the received information specifying updates to the pose of the second mobile device.

10. The non-transitory computer-readable storage medium of claim 9 wherein the communication setup information is dynamically generated.

11. The non-transitory computer-readable storage medium of claim 9 wherein the operations further comprise:

transmitting a message advertising at least part of the communication setup information.

12. The non-transitory computer-readable storage medium of claim 9, wherein the operations further comprise:

aligning a coordinate system between the first mobile device and the second mobile device based on the relative pose between the first mobile device and the second mobile device.

13. The non-transitory computer-readable storage medium of claim 12, wherein the machine-readable code comprises the fiducial markings.

14. The non-transitory computer-readable storage medium of claim 12, wherein the updates to the information specifying the pose of the second mobile device are received by the first mobile device via the communication link.

15. A head-worn device comprising:

a processor; and a memory storing instructions that, when executed by the processor, configure the head-worn device to perform operations for establishing a communication link between the head-worn device and a mobile device, the operations comprising:

capturing, by the head-worn device, of an image of a machine-readable code displayed on the mobile device;

decoding, by the head-worn device, communication setup information from the captured image of the machine-readable code;

establishing a communication link with the mobile device using the communication setup information;

determining a relative pose between the head-worn device and the mobile device by generating a pose transformation of fiducial markings displayed by the mobile device;

receiving information specifying updates to a pose of the mobile device; and performing user interface actions on the head-worn device based on the received information specifying updates to the pose of the mobile device.

16. The head-worn device of claim 15 wherein the communication setup information is dynamically generated.

17. The head-worn device of claim 15, wherein the operations further comprise:

scanning for a message from the mobile device, advertising at least part of the communication setup information.

18. The head-worn device of claim 15, wherein the operations further comprise:

aligning a coordinate system between the head-worn device and the mobile device based on the relative pose between the head-worn device and the mobile device.

19. The head-worn device of claim 18, wherein the machine-readable code comprises the fiducial markings.

20. The head-worn device of claim 19 wherein updates to the information specifying the pose of the mobile device are received by the head-worn device via the communication link.

\* \* \* \* \*